United States Patent
Shenoy et al.

(10) Patent No.: US 11,807,958 B2
(45) Date of Patent: Nov. 7, 2023

(54) OLEOPHOBIC POLYAMIDE FINE FIBERS, METHODS, FILTER MEDIA, AND FILTER ELEMENTS

(71) Applicant: DONALDSON COMPANY, INC., Minneapolis, MN (US)

(72) Inventors: Suresh L. Shenoy, Bloomington, MN (US); Thomas M. Weik, Deephaven, MN (US); Matthew P. Goertz, Bloomington, MN (US)

(73) Assignee: DONALDSON COMPANY, INC., Minneapolis, MN (US)

( * ) Notice: Subject to any disclaimer, the term of this patent is extended or adjusted under 35 U.S.C. 154(b) by 290 days.

(21) Appl. No.: 16/772,296

(22) PCT Filed: Dec. 12, 2018

(86) PCT No.: PCT/US2018/065271
§ 371 (c)(1),
(2) Date: Jun. 12, 2020

(87) PCT Pub. No.: WO2019/118636
PCT Pub. Date: Jun. 20, 2019

(65) Prior Publication Data
US 2021/0079560 A1  Mar. 18, 2021

Related U.S. Application Data

(60) Provisional application No. 62/598,303, filed on Dec. 13, 2017.

(51) Int. Cl.
*D01F 1/10* (2006.01)
*D01D 5/00* (2006.01)
(Continued)

(52) U.S. Cl.
CPC ........... *D01F 1/10* (2013.01); *B01D 39/1623* (2013.01); *D01D 5/003* (2013.01); *D01F 6/60* (2013.01);
(Continued)

(58) Field of Classification Search
CPC .................................................. Y10S 428/903
See application file for complete search history.

(56) References Cited

U.S. PATENT DOCUMENTS

| 5,645,627 A | 7/1997 | Lifshutz et al. |
| 5,688,884 A | 11/1997 | Baker et al. |

(Continued)

FOREIGN PATENT DOCUMENTS

| CN | 1468136 | 1/2004 |
| CN | 1507460 | 6/2004 |

(Continued)

OTHER PUBLICATIONS

ASTM Designation F 1215-89, "Standard Test Method for Determining the Initial Efficiency of a Flatsheet Filter Medium in an Airflow Using Latex Spheres," Annual Book of ASTM Standards, Apr. 1989, American Society for Testing and Materials, Phildelphia, Pennsylvania, 9 pages.

(Continued)

*Primary Examiner* — Arti Singh-Pandey
(74) *Attorney, Agent, or Firm* — Mueting Raasch Group

(57) ABSTRACT

The present disclosure provides a unique fine fiber material that is formed from a fiber-forming polyamide with a fluorochemical urethane additive, a method of making such fiber material, as well as filter media and filter elements including such fibers.

13 Claims, 10 Drawing Sheets

Figures 1A, 1B:
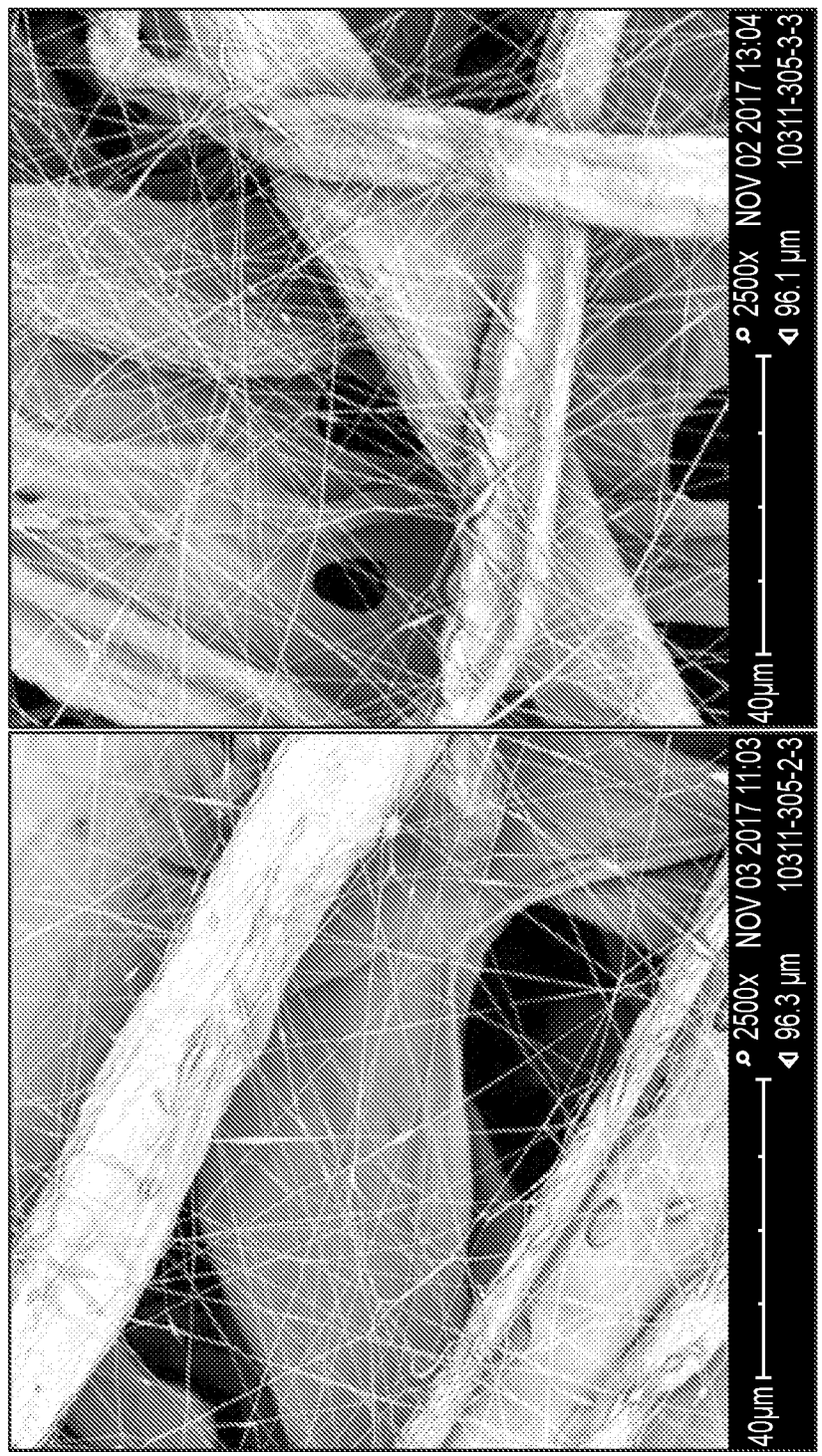

(51) Int. Cl.
*D01F 6/60* (2006.01)
*D01F 6/90* (2006.01)
*B01D 39/16* (2006.01)

(52) U.S. Cl.
CPC ........ *D01F 6/90* (2013.01); *B01D 2239/0428* (2013.01); *B01D 2239/0618* (2013.01); *B01D 2239/0631* (2013.01); *B01D 2239/0654* (2013.01); *D10B 2401/021* (2013.01); *D10B 2505/04* (2013.01)

(56) References Cited

U.S. PATENT DOCUMENTS

| | | |
|---|---|---|
| 6,646,088 B2 | 11/2003 | Fan et al. |
| 6,673,136 B2 | 1/2004 | Gillingham et al. |
| 6,716,274 B2 | 4/2004 | Gogins et al. |
| 6,743,273 B2 | 6/2004 | Chung et al. |
| 6,746,517 B2 | 6/2004 | Benson et al. |
| 6,800,117 B2 | 10/2004 | Barris et al. |
| 6,803,109 B2 | 10/2004 | Qiu et al. |
| 6,875,256 B2 | 4/2005 | Gillingham et al. |
| 6,890,360 B2 | 5/2005 | Cote et al. |
| 7,316,723 B2 | 1/2008 | Chung et al. |
| 8,030,430 B2 | 10/2011 | Fan et al. |
| 8,594,382 B2 | 11/2013 | Lehmann et al. |
| 8,801,998 B2 | 8/2014 | Behrendt et al. |
| 2003/0026997 A1* | 2/2003 | Qiu .................. C08G 18/3861 525/123 |
| 2003/0149218 A1 | 8/2003 | Cote et al. |
| 2004/0147188 A1 | 7/2004 | Johnson et al. |
| 2005/0075471 A1 | 4/2005 | Fan et al. |
| 2008/0229976 A1 | 9/2008 | Amos et al. |
| 2009/0032475 A1 | 2/2009 | Ferrer et al. |
| 2010/0206800 A1 | 8/2010 | Veit et al. |
| 2010/0297906 A1 | 11/2010 | Steckl et al. |
| 2013/0206683 A1 | 8/2013 | Behrendt et al. |

FOREIGN PATENT DOCUMENTS

| | | |
|---|---|---|
| CN | 1745208 | 3/2006 |
| CN | 101535362 | 9/2009 |
| CN | 102953146 | 3/2013 |
| DE | 102009043273 | 4/2010 |
| EP | 1 733 776 | 12/2006 |
| EP | 2 226 107 | 9/2010 |
| JP | 2001-511477 | 8/2001 |
| JP | 2004-508168 | 3/2004 |
| JP | 2004-530002 | 9/2004 |
| JP | 2007-211376 | 8/2007 |
| WO | 99/05345 | 2/1999 |
| WO | 02/20134 | 3/2002 |
| WO | 02/072657 | 9/2002 |
| WO | 2008/063268 | 5/2008 |
| WO | 2017/196653 | 11/2017 |

OTHER PUBLICATIONS

International Patent Application No. PCT/US2018/065271 filed Dec. 12, 2018; International Preliminary Report on Patentability, dated Jun. 16, 2020, 7 pages.

International Patent Application No. PCT/US2018/065271 filed Dec. 12, 2018; International Search Report and Written Opinion dated Mar. 18, 2019, 13 pages.

Yang et al., "Plastic Molding Process, 3rd edition", Jun. 30, 2014, China Light Industry Press, publishing information page, pp. 159-161 and 168. No translation provided, see Second Office Action of Chinese Application No. 201880079939.8 dated Jan. 12, 2023 for relevance.

Chinese Patent Application No. 201880079939.8, filed Dec. 12, 2018, Second Office Action and Search Report dated Jan. 12, 2023, with English Translation provided, 36 pages.

* cited by examiner

OLEOPHOBIC POLYAMIDE FINE FIBERS, METHODS, FILTER MEDIA, AND FILTER ELEMENTS

CROSS-REFERENCE TO RELATED APPLICATION

The present application is the § 371 U.S. National Stage of International Application No. PCT/US2018/065271, filed Dec. 12, 2018, which claims the benefit of U.S. Provisional Application Ser. No. 62/598,303, filed on Dec. 13, 2017, each of which are incorporated herein by reference in their entireties.

BACKGROUND OF THE DISCLOSURE

Polymer webs have been made by electrospinning, rotary spinning, centrifugal spinning, melt spinning, extrusion melt spinning, air laid processing, or wet laid processing. The filtration efficiency of such filters is characteristic of the filtration media and is related to the fraction of the particulate removed from the mobile fluid stream.

Fine fiber technologies that contemplate polymeric materials mixed or blended with a variety of other substances are known. Certain of the disclosed fibers comprise an axial core or a polymeric material. Surrounding the axial core can be found a layer of a coating material such as a phenolic oligomer or a fluoropolymer component. While many of these fine fiber materials have adequate performance for a number of filtration end uses, in applications where the filter is subjected to a wide range of environmental conditions, where mechanical stability is required, improvements in fiber properties is still needed.

SUMMARY

The present disclosure provides a unique fine fiber material that is formed from a fiber-forming polyamide with a fluorochemical urethane additive.

In one embodiment, there is provided a fine fiber that includes: a fiber-forming polyamide; and a fluorochemical urethane additive incorporated within the fine fiber. In some embodiments, the fluorochemical urethane additive is present in an amount effective to enhance the oleophobicity and hydrophobicity of the fine fiber compared to the fine fiber without such additive. In this context, "enhancing" means improving already existing oleophobicity or hydrophobicity and/or creating oleophobicity or hydrophobicity.

The present disclosure provides methods of making fine fibers.

In one embodiment of the present disclosure, there is provided a method of making fine fibers, wherein the method includes: providing a fiber-forming polyamide; providing a fluorochemical urethane additive; and combining the fiber-forming polyamide and the fluorochemical urethane additive under conditions effective to form a plurality of fine fibers.

The present disclosure also provides fine fibers prepared according to methods disclosed herein.

The present disclosure also provides a filter media that includes a filtration substrate and a layer including a plurality of the fine fibers described herein disposed on the substrate.

The present disclosure also provides a filter element that includes a filter media described herein.

Herein, a "fine" fiber has an average fiber diameter of no greater than 10 microns. Typically, this means that a sample of a plurality of fibers of the present disclosure has an average fiber diameter of no greater than 10 microns. In certain embodiments, such fibers have an average diameter of up to 5 microns, up to 4 microns, up to 3 microns, up to 2 microns, up to 1 micron, up to 0.8 micron, or up to 0.5 micron. In certain embodiments, such fibers have an average diameter of at least 0.05 micron, or at least 0.1 micron.

The "fiber-forming" polyamide (e.g., homopolymer or copolymer) is one that is capable of forming a fine fiber in the absence of any additives.

The term "alkyl" refers to a monovalent group that is a radical of an alkane, which is a saturated hydrocarbon. The alkyl group can be linear, branched, cyclic, or combinations thereof; "perfluoro-" (for example, in reference to a group or moiety, such as in the case of "perfluoroalkyl") and "perfluorinated" mean a group or compound completely fluorinated such that all hydrogen atoms in the C—H bonds have been replaced by C—F bonds. Unless otherwise specified, an alkyl can include up to 20 carbon atoms, up to 12 carbon atoms, up to 10 carbon atoms, up to 5 carbon atoms. Unless otherwise specified, an alkyl can include at least 1 carbon atom, at least 2 carbon atoms, or at least 3 carbon atoms.

The term "heteroalkyl group" means an alkyl group having at least one —CH$_2$-replaced with a heteroatom such as NR$^1$, O, or S, wherein R$^1$ is H or an alkyl group. The alkyl group can be linear, branched, cyclic, or combinations thereof; "perfluoro-" (for example, in reference to a group or moiety, such as in the case of "perfluoroheteroalkyl") and "perfluorinated" mean a group or compound completely fluorinated such that all hydrogen atoms in the C—H bonds have been replaced by C—F bonds. Unless otherwise specified, a heteroalkyl can include up to 20 carbon atoms, up to 12 carbon atoms, up to 10 carbon atoms, up to 5 carbon atoms. Unless otherwise specified, a heteroalkyl can include at least 1 carbon atom, at least 2 carbon atoms, or at least 3 carbon atoms.

When a group is present more than once in a formula described herein, each group is "independently" selected, whether specifically stated or not. For example, when more than one R group is present in a formula, each R group is independently selected. Furthermore, subgroups contained within these groups are also independently selected.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, "up to" a number (e.g., up to 50) includes the number (e.g., 50).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DRAWINGS

The disclosure may be more completely understood in connection with the following drawings.

FIG. 1: Scanning Electron Micrograph (SEM) images showing a comparison of fiber morphology for fibers from (A) Example 1b (Nylon resin SVP 651 "651-Control" without additive) and (B) Example 6b (SVP 651 with oleophobic SRC 220 fluorochemical urethane additive).

Figure 2:
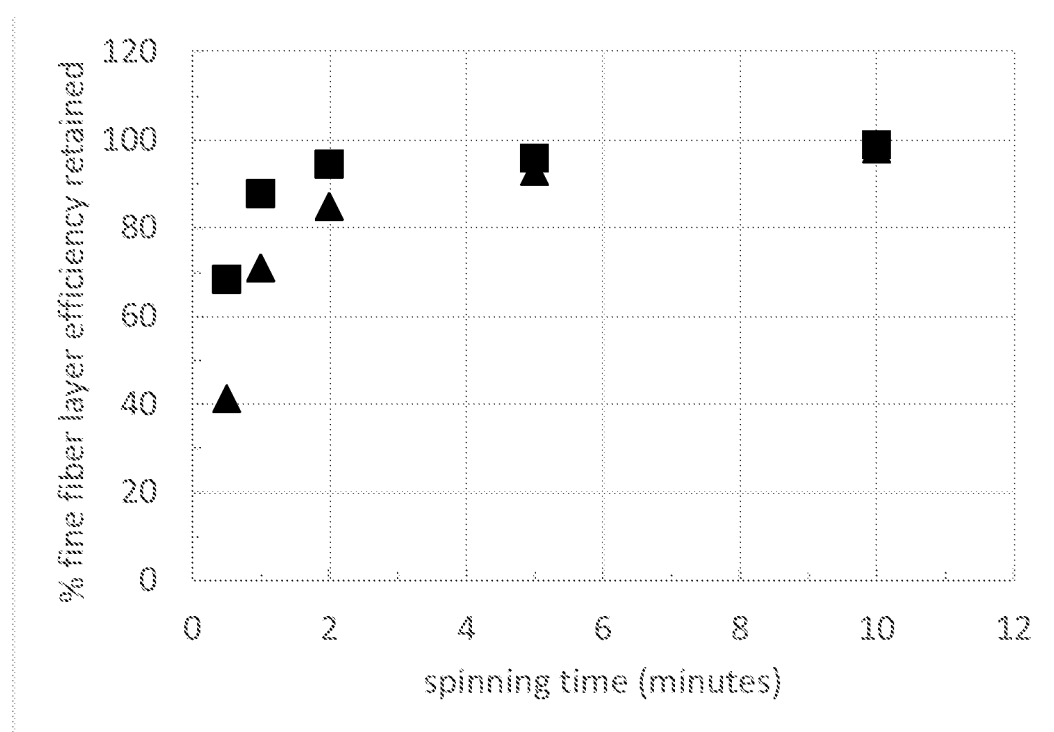

FIG. 2: Graph of percent (%) fine fiber layer efficiency retained from (▲) Example 1b (Nylon resin SVP 651 "651-Control" without additive) and (■) Example 6b (SVP 651 with oleophobic SRC 220 fluorochemical urethane additive).

Figure 3:
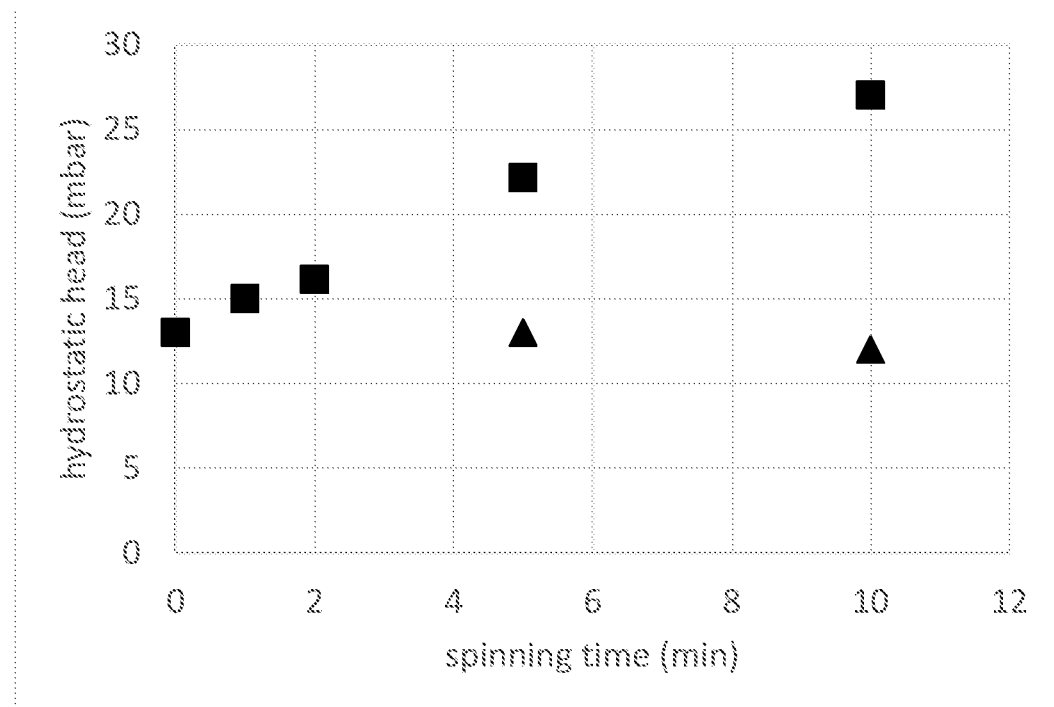

FIG. 3: Graph of hydrostatic head (in millibar (mbar)) as a function of fine fiber coverage (increasing spinning times in minutes (min)) in samples that include additive (SRC 220 (solids):651 ratio of 20:100 by weight) ((■) Example 8 (30 sec), Example 9 (1 min), Example 10 (2 min), Example 11 (5 min), and Example 12 (10 min)) in contrast to the samples where no additive is present ((▲) Example 16 (5 min) and Example 17 (10 min)).

Figure 4:
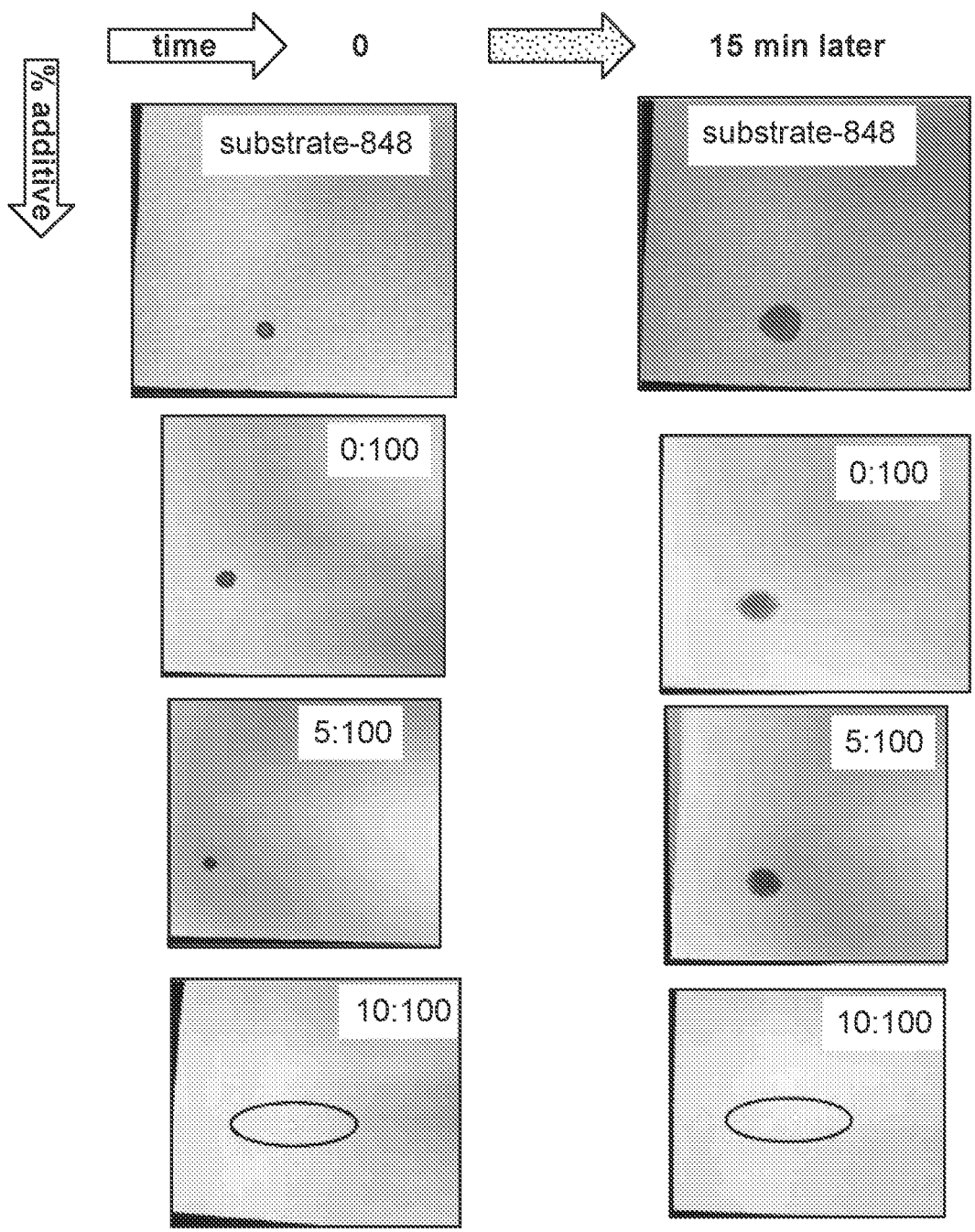

FIG. 4: Water drop resistance (repellency) over time as a function of additive concentration (SRC 220 (solids):651 ratio by weight) on non-post-treated samples. Substrate 848=substrate only; 0:100=Example 1a; 5:100=Example 4a; 10:100=Example 5a.

Figure 5:
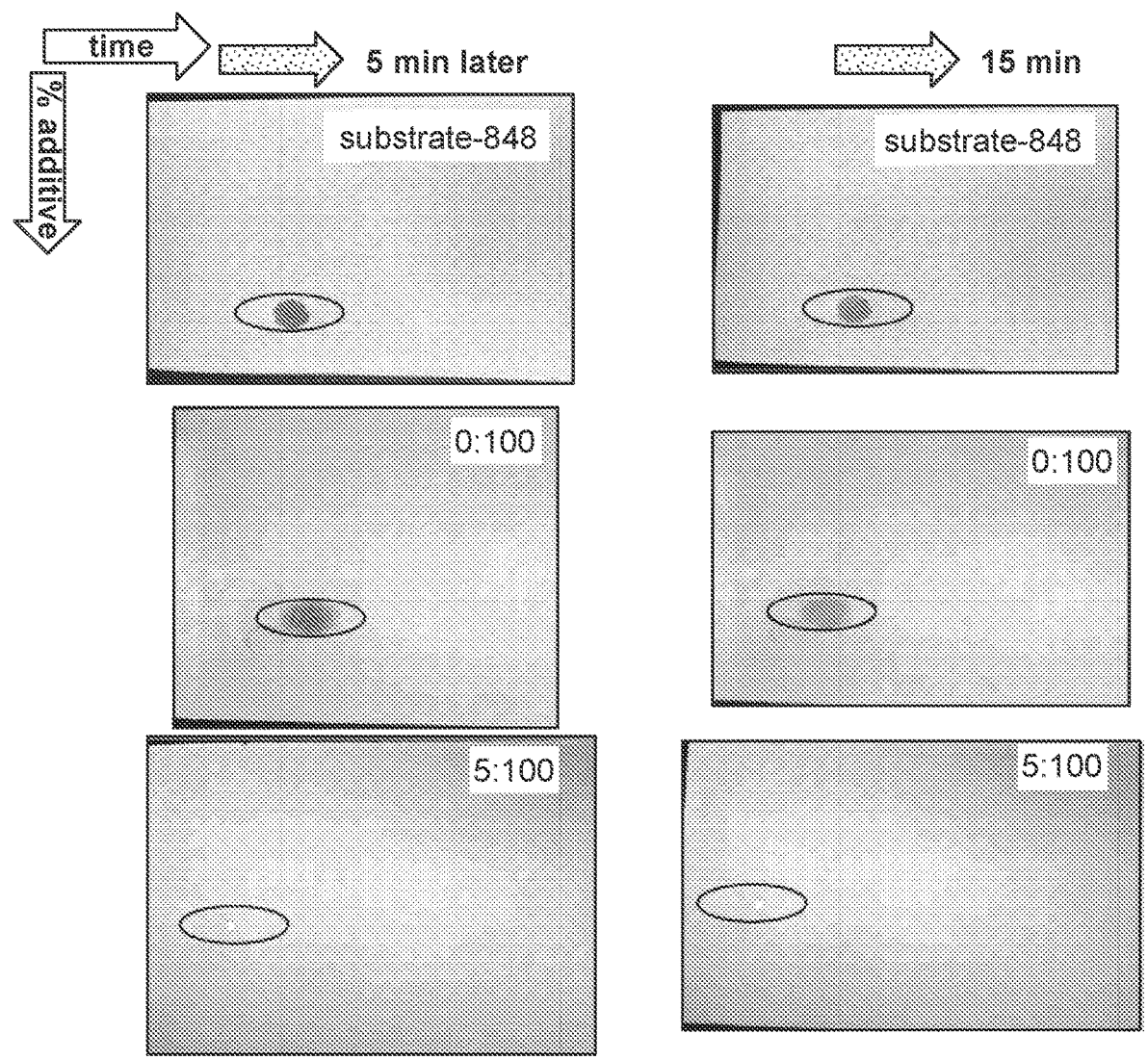

FIG. 5: Water drop resistance (repellency) over time as a function of additive concentration (SRC 220 (solids):651 ratio by weight) on post-treated samples at 125° C. for 10 minutes. Substrate 848=substrate only; 0:100=Example 1b; 5:100=Example 4b.

Figure 6:
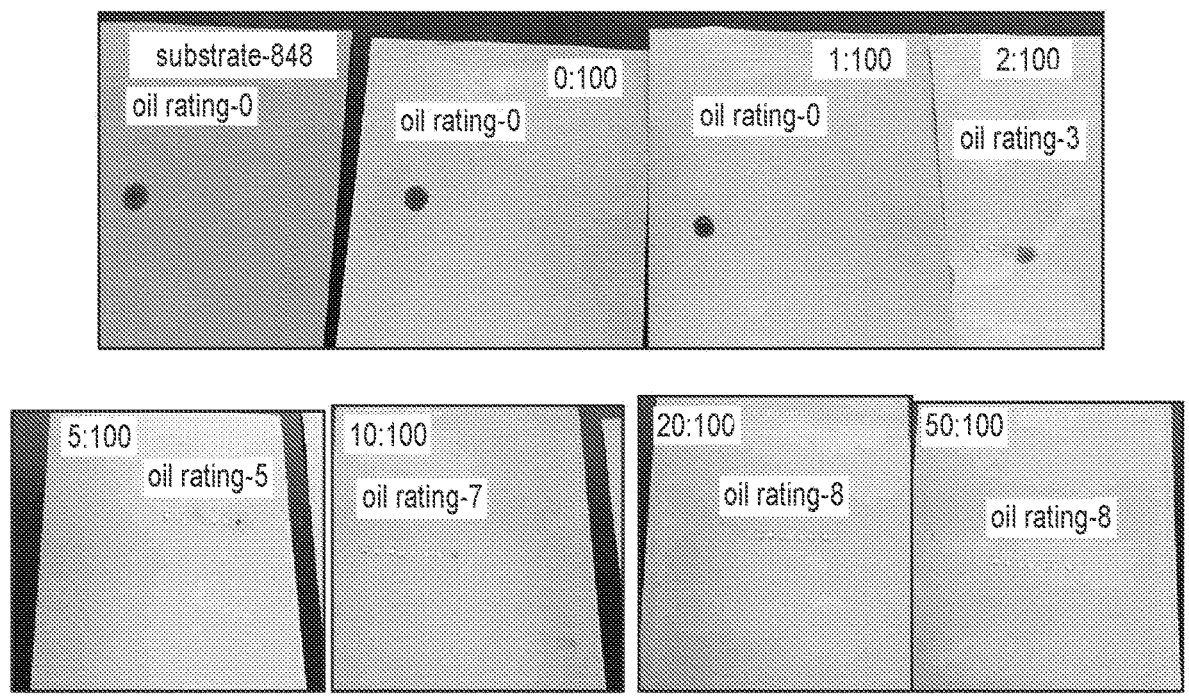

FIG. 6: Oil repellency rating as a function of additive concentration (SRC 220 (solids):651 ratio by weight) on post-treated samples at 125° C. for 10 minutes. Substrate 848=substrate only; 0:100=Example 1b; 1:100=Example 2b; 2:100=Example 3b; 5:100=Example 4b; 10:100=Example 5b; 20:100=Example 6b; 50:100=Example 7b.

Figure 7A:
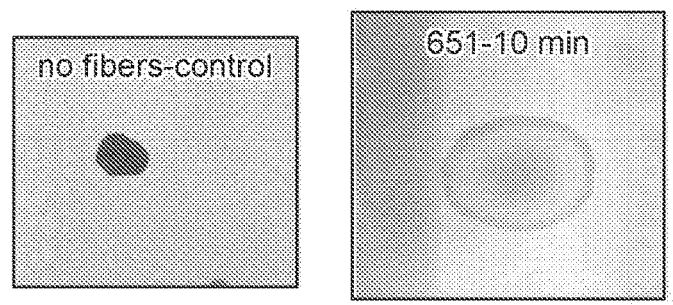
Figure 7B:
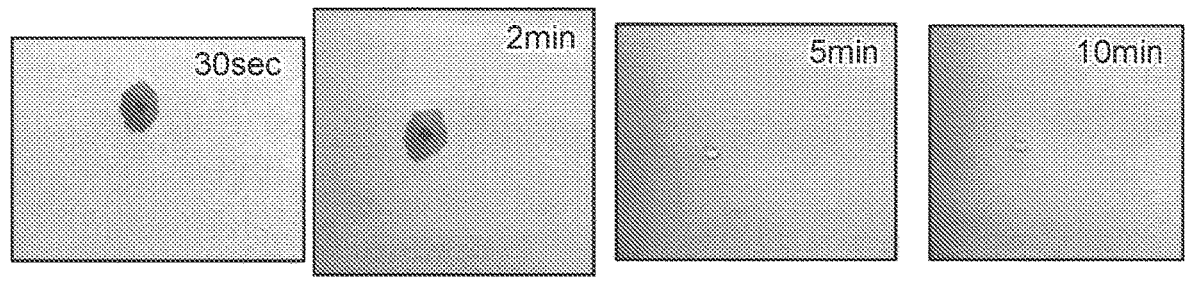

FIG. 7: Water drop resistance (repellency) as a function of fine fiber coverage on post-treated samples (Examples 8 and 10-12 versus Example 17). (A): No fibers-control=substrate only; 651-10 min=Example 17. (B): spinning times of 30 sec=Example 8; 2 min=Example 10; 5 min=Example 11; 10 min=Example 12.

Figure 8A:
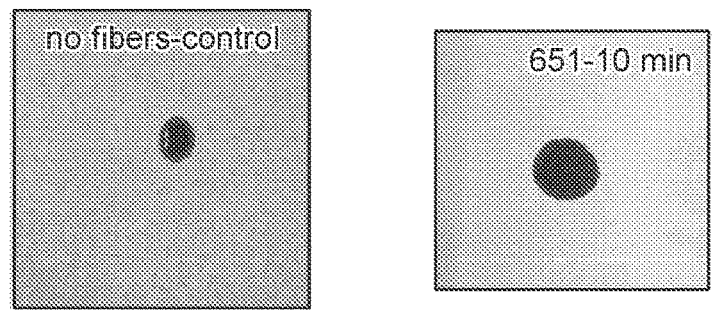
Figure 8B:
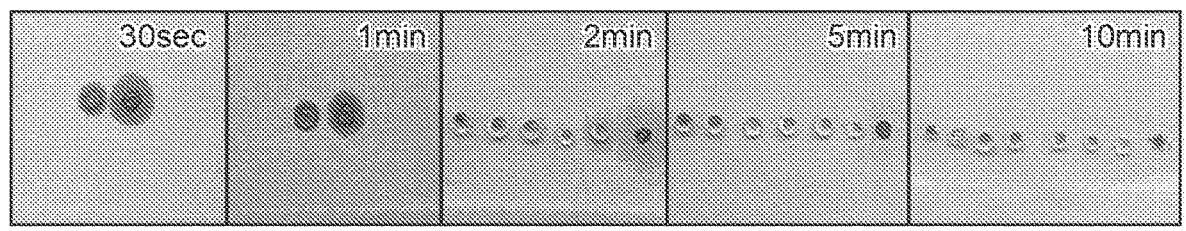

FIG. 8: Oil repellency rating as a function of fine fiber coverage on post-treated samples (Examples 8-12 versus Example 17). (A): No fibers-control=substrate only; 651-10 min=Example 17. (B): spinning times of 30 sec=Example 8; 1 min=Example 9; 2 min=Example 10; 5 min=Example 11; 10 min=Example 12.

Figure 9:
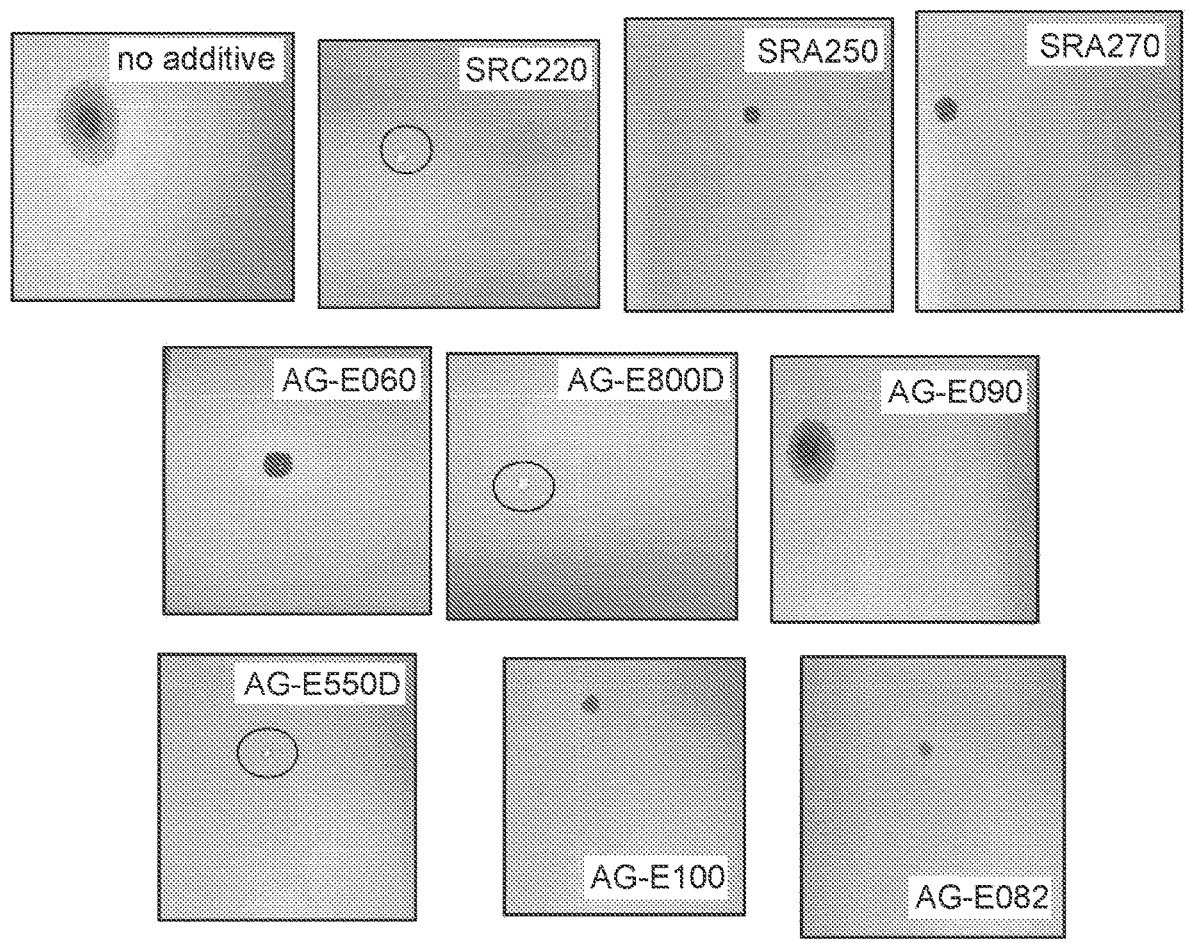

FIG. 9: Water drop resistance (repellency) as a function of type of additive (additive (solids):651=20:100 by weight): No additive=Example 18 (651-control); SRC 220=Example 19; SRA 250=Example 20; SRA 270=Example 21; AG-E060=Example 22; AG-E800D=Example 23; AG-E090=Example 24; AG-E550D=Example 25; AG-E100=Example 26; AG-E082=Example 27.

Figure 10:
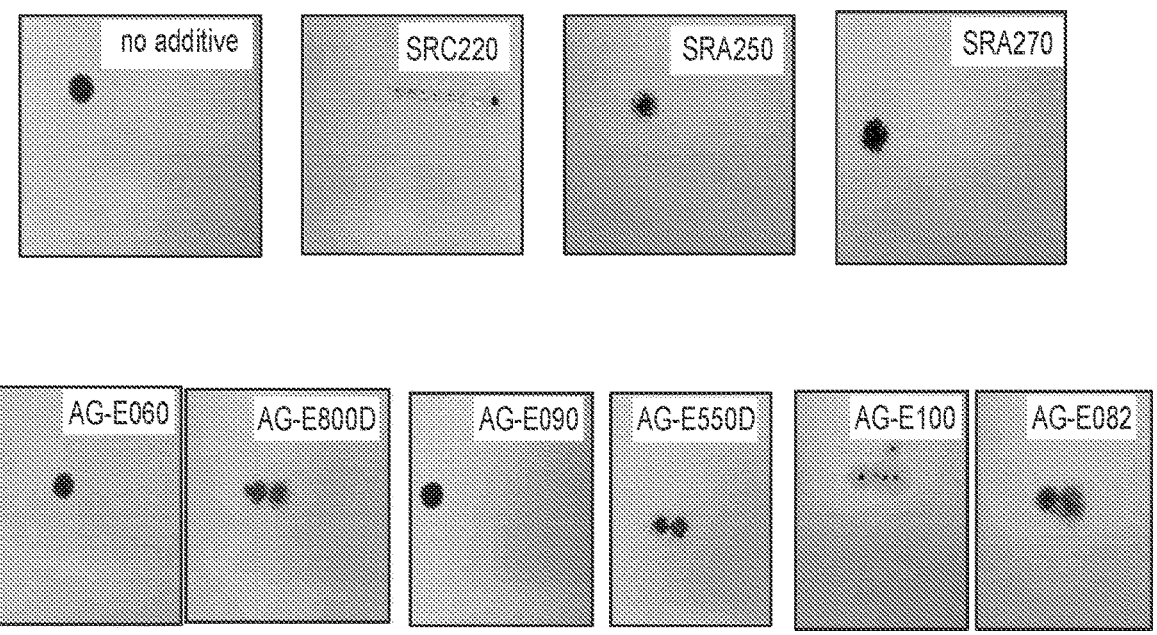

FIG. 10: Oil repellency rating as a function of type of additive (additive (solids):651=20:100 by weight): No additive=Example 18 (651-control); SRC 220=Example 19; SRA 250=Example 20; SRA 270=Example 21; AG-E060=Example 22; AG-E800D=Example 23; AG-E090=Example 24; AG-E550D=Example 25; AG-E100=Example 26; AG-E082=Example 27.

Figure 11:
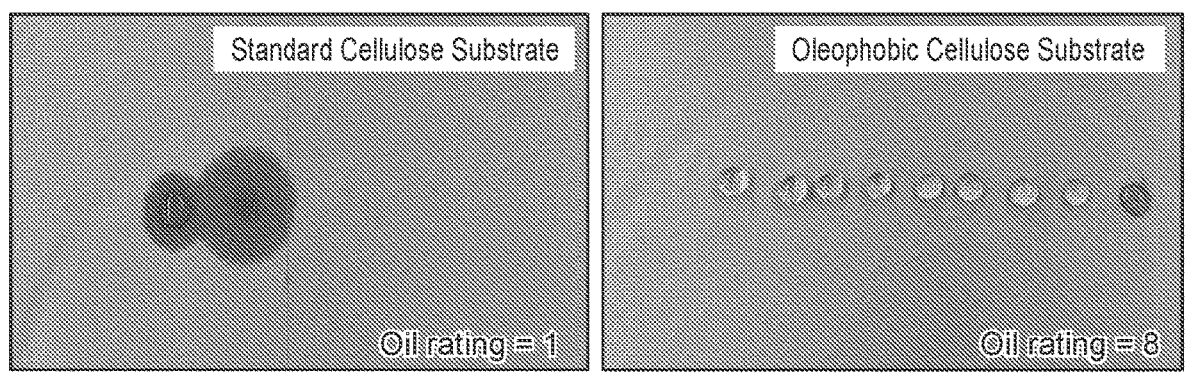

FIG. 11: Oil repellency rating as a function of substrate chemistry using standard cellulose (Example 8) and oleophobic cellulose (Example 28).

DETAILED DESCRIPTION OF ILLUSTRATIVE EMBODIMENTS

The present disclosure provides a unique fine fiber material that is formed from a fiber-forming polyamide with a fluorochemical urethane additive incorporated within the fine fiber (i.e., mixed within the polyamide of each fine fiber). Such additive provides a facile mechanism for manufacturing fine fibers with enhanced oleophobicity and hydrophobicity (including oleophobic and hydrophobic properties such fibers may not have previously displayed).

Fluorochemical Urethane Additive

Typically, the fluorochemical urethane additives are selected such that it enhances (e.g., improves or creates) the oleophobicity and hydrophobicity of the fine fiber compared to the fine fiber without such additive.

In certain embodiments, suitable fluorochemical urethane additives are film-forming polymers, particularly when in an admixture with a fiber-forming polyamide. In certain embodiments, suitable fluorochemical urethane additives are at least partially compatible (e.g., at least partially miscible) such that there is little or no phase separation with a fiber-forming polyamide in the formation of a film. A relatively clear (transparent or translucent) film is formed if there is little or no phase separation.

The fluorochemical urethane additive is selected such that it is preferably soluble or dispersible in a solvent chosen for the polyamide material for processing, such as in electrospinning. This results in the additive and the polyamide being mixed together prior to fiber formation and the resultant fibers being made of a mixture of the polyamide and fluorochemical urethane additive.

In certain embodiments, the fluorochemical urethane additive is a surface-migrating agent. Surface-migrating agents are compounds that are capable of migrating to the surface of a fine fiber, typically during fiber formation, although the majority of the fluorochemical urethane additive is incorporated within the body of each fine fiber. Such surface migration may be enhanced by post-fiber formation heat treatment, if desired.

In certain embodiments, suitable fluorochemical urethane additives include one or more perfluorinated alkyl groups and/or perfluorinated heteroalkyl groups, and each alkyl or heteroalkyl group is bonded to a sulfonamido ($-SO_2NR^2-$) group, a carboxamido ($-C(O)NR^3-$) group, a carboxyl group ($-C(O)O-$), or a sulfonyl group ($-SO_2-$), wherein $R^2$ and $R^3$ are independently a hydrogen or an alkyl. In certain embodiments, each alkyl or heteroalkyl group is bonded to a sulfonamido ($-SO_2NR^2-$) group or a carboxamido ($-C(O)NR^3-$) group, wherein $R^2$ and $R^3$ are independently a hydrogen or an alkyl. In certain embodiments, the alkyl and heteroalkyl groups include 2-12 carbon atoms, and in certain embodiments 2-6 carbon atoms.

Examples of fluorochemical urethane additives are described in U.S. Pat. Nos. 6,646,088, 6,803,109, 6,890,360, and 8,030,430, and in U.S. Pat. Application No. 2003/0149218, 2004/0147188, 2005/0075471, and 2008/0229976.

Furthermore, in certain embodiments, such fluorochemical urethane additives typically do not include acrylate or methacrylate functional groups.

In certain embodiments, the fluorochemical urethane additive has a weight average molecular weight of less than 3000 Daltons.

Examples of fluorochemical urethane additives include that available under the trade designation SRC 220 stain resistant additive and sealer from 3M Company St. Paul, Minn.), which is an aqueous-based fluorinated polyurethane dispersion sold for use in making architectural paints and concrete coatings, thereby rendering porous hard materials such as concrete, natural stone, and grout stain resistant.

In certain embodiments, the fluorochemical urethane additive is the only additive present. Thus, in certain embodiments, the fine fiber consists essentially of a fiber-forming polyamide and a fluorochemical urethane additive incorporated within the fine fiber. That is, in certain embodiments there are no other additives present that enhance the surface or bulk properties of the fine fiber. In certain embodiments, the fine fiber consists of a fiber-forming polyamide and a fluorochemical urethane additive incorporated within the fine fiber. That is, in certain embodiments, there are no other components present other than the fiber-forming polyamide and the fluorochemical urethane additive.

Various combinations of fluorochemical urethane additives may be used if desired. In certain embodiments, the various fluorochemical urethane additives do not react with each other to form any chemical bonds therebetween.

Typically, a fluorochemical urethane additive is selected to "enhance" the oleophobic and hydrophobic properties of the fibers compared to the fibers without the reactive additive(s). This means that one or more fluorochemical urethane additives are selected to simply enhance the oleophobicity and the hydrophobicity the fibers already possessed compared to the fibers without the fluorochemical urethane additive(s). This also means that one or more fluorochemical urethane additives are selected to provide the resultant fine fibers with oleophobicity and hydrophobicity such fibers would not possess without the fluorochemical urethane additive(s).

In certain embodiments, a fluorochemical urethane additive is selected and included in an amount effective to provide a fine fiber that demonstrates an oleophobic level of at least 3, at least 4, at least 5, or at least 6, according to the Oil Repellency Test Method in the Examples Section.

In certain embodiments, a fluorochemical urethane additive is selected and included in an amount effective to provide a fine fiber that demonstrates a hydrophobic behavior according to the Water Drop Test Method in the Examples Section.

The amount of fluorochemical urethane additives used can be readily determined by one of skill in the art to obtain the desired result. Typically, the amount of fluorochemical urethane additive(s) relative to the fiber-forming polyamide (s) is at least 2:100, or at least 5:100, or at least 10:100, or at least 20:100 (weight ratio of additive solids to polymer). Typically, the amount of fluorochemical urethane additive(s) relative to the fiber-forming polyamide(s) is up to 100:100, or up to 50:100 (weight ratio of additive solids to polymer).

Fiber-Forming Polyamide Polymers

Many types of polyamides that are capable of forming fibers are useful as the polymer materials in the fibers of the disclosure.

One useful class of polyamide polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of ε-caprolactam in the presence of a small amount of water. This reaction forms a nylon-6 (made from a cyclic lactam, also known as ε-aminocaproic acid) that is a linear polyamide. Further, nylon copolymers are also contemplated. Exemplary nylon materials include nylon-6, nylon-6,6, nylon-6,10, mixtures or copolymers thereof.

Copolymers can be made, for example, by combining various diamine compounds, various diacid compounds and various cyclic lactam structures in a reaction mixture and then forming the nylon with randomly positioned monomeric materials in a polyamide structure. For example, a nylon-6,6-6,10 material is a nylon manufactured from hexamethylene diamine and a $C_6$ and a $C_{10}$ blend of diacids. A nylon-6-6,6-6,10 is a nylon manufactured by copolymerization of ε-aminocaproic acid, hexamethylene diamine and a blend of a $C_6$ and a $C_{10}$ diacid material. Herein, the term "copolymer" includes polymers made from two or more different monomers and include terpolymers, etc.

Various combinations of polyamides can be used if desired. Preferred polymers within this embodiment include nylons.

Typically, such fiber-forming polyamides used in the fibers of the disclosure are nonreactive with the fluorochemical urethane additive, although reactivity is not necessarily excluded. Thus, in certain embodiments, the fluorochemical urethane additive is not chemically bonded to the fiber-forming polyamide.

Formation of Fine Fibers

Fine fibers of the present disclosure can be prepared using a method that includes: providing a fiber-forming polyamide; providing a fluorochemical urethane additive; and combining the fiber-forming polyamide and the fluorochemical urethane additive under conditions effective to form a plurality of fine fibers wherein the fluorochemical urethane additive is incorporated within the fine fibers (i.e., within the bulk or body of each fine fiber). By this it is meant that the fluorochemical urethane additive and fiber-forming polyamide may be combined, thoroughly mixed together, and then formed into fibers in distinct steps. Alternatively, the fiber forming may occur immediately upon combining the fluorochemical urethane additive and the fiber-forming polyamide such that thorough mixing may not be complete before fiber formation, although a mixture is still formed. Thus, the fluorochemical urethane additive does not merely form a coating on each individual fine fiber.

The polymer materials (e.g., single polymer or polymer mixture or blend) are selected such that they can be combined with the fluorochemical urethane additives in a solution or dispersion. The pH of such solution or dispersion is preferably within a range of 6 to 8.

In certain embodiments, the fine fibers are electrospun or spun using centrifugal force. Thus, in certain embodiments, the polymer material(s) and fluorochemical urethane additive(s) are dispersible or soluble in at least one common solvent or solvent blend suitable for electrospinning. They should be substantially stable in the solution or dispersion for sufficient time such that the fiber can be formed.

Examples of suitable solvents include polar protic and aprotic solvents such as water, ethanol, propanol, isopropanol, butanol, tetrahydrofuran (THF), dioxolane, acetone, ethyl acetate, etc.

The fluorochemical urethane additive may be a surface-migrating agent, thereby resulting in the fluorochemical urethane additive being exposed at the surface of each fine fiber while still being incorporated within the body or bulk of each fiber (as opposed to a coating being only on the surface of each fine fiber).

In certain embodiments, each fine fiber can include a core phase and a coating phase, wherein the core phase includes a fiber-forming polyamide and the coating phase includes a fluorochemical urethane additive. It should be understood, however, that each phase includes both the polyamide and the fluorochemical urethane additive.

In certain embodiments, each fine fiber can include a core phase, a coating phase, and a transition phase. In certain of such three-phase fibers, the core phase predominantly includes the fiber-forming polyamide, the coating phase predominantly includes the fluorochemical urethane additive, and the transition phase includes the fiber-forming polymer and the fluorochemical urethane additive. In this context, "predominantly" means the referenced material is present in a particular region (e.g., coating, layer, or phase) in a major amount (i.e., greater than 50% by weight) of the material in that region, although each phase includes both the polyamide and the fluorochemical urethane additive.

Fine fibers of the disclosure can be made using a variety of techniques including electrostatic spinning, centrifugal or rotary spinning, wet spinning, dry spinning, melt spinning, extrusion spinning, direct spinning, gel spinning, etc.

The fine fibers are collected on a support layer (i.e., a substrate) during, for example, electrostatic or melt spinning formation, and are often heat treated after fiber making. Preferably, the layer of fine fiber material is disposed on a first surface of a layer of permeable coarse fibrous media (i.e., support layer) as a layer of fiber. Also, preferably the first layer of fine fiber material disposed on the first surface of the first layer of permeable coarse fibrous material has an overall thickness that is no greater than 50 micrometers (microns or µm), more preferably no greater than 30 microns, even more preferably no more than 20 microns, and most preferably no greater than 10 microns. Typically, and preferably, the thickness of the fine fiber layer is within a thickness of 1-20 times (often 1-8 times, and more preferably no more than 5 times) the fine fiber average diameter used to make the layer. In certain embodiments, the fine fiber layer has a thickness of at least 0.05 µm.

Fine fibers of the disclosure can be made preferably using the electrostatic spinning process. A suitable electrospinning apparatus for forming the fine fibers includes a reservoir in which the fine fiber forming solution is contained, and an emitting device, which generally consists of a rotating portion including a plurality of offset holes. As it rotates in the electrostatic field, a droplet of the solution on the emitting device is accelerated by the electrostatic field toward the collecting media. Facing the emitter, but spaced apart therefrom, is a grid upon which the collecting media (i.e., a substrate or combined substrate) is positioned. Air can be drawn through the grid. A high voltage electrostatic potential is maintained between emitter and grid by means of a suitable electrostatic voltage source. The substrate is positioned in between the emitter and grid to collect the fiber.

Specifically, the electrostatic potential between grid and the emitter imparts a charge to the material which causes liquid to be emitted therefrom as thin fibers which are drawn toward a grid where they arrive and are collected on a substrate. In the case of the polymer in solution, a portion of the solvent is evaporated off the fibers during their flight to the substrate. The fine fibers bond to the substrate fibers as the solvent continues to evaporate and the fiber cools. Electrostatic field strength is selected to ensure that as the polymer material is accelerated from the emitter to the collecting media, the acceleration is sufficient to render the polymer material into a very thin microfiber or nanofiber structure. Increasing or slowing the advance rate of the collecting media can deposit more or less emitted fibers on the forming media, thereby allowing control of the thickness of each layer deposited thereon.

Alternatively, the electrospinning apparatus for forming fine fibers can be a pendant drop apparatus, i.e., syringe filled with polymer solution. A high voltage is applied to the needle attached to the syringe and the polymer solution is pumped at a specified pump rate. As the drop of the polymer solution emerges from the needle, it forms a Taylor cone under the influence of the electrostatic field. At sufficiently high voltages, a jet is emitted from the Taylor cone which undergoes extension and fine fibers are formed and deposited on the media attached to a rotating mandrel which acts as the collector. Electrospinning processes usually use polymer solutions with 5-20% solids (on polymer) concentration. Solvents that are safe and easy to use are desired in industrial applications. On the other hand, fibers formed with such solvents often need to survive and perform in a wide variety of environments.

In certain embodiments, fibers of the present disclosure are heat treated in a post-fiber forming treatment process at a temperature of at least 100° C., at least 110° C., at least 120° C., or at least 125° C. In certain embodiments, fibers of the present disclosure are heat treated at a temperature of up to 135° C., or up to 130° C. In certain embodiments, fibers of the present disclosure are heat treated for a time of at least 0.5 minute, at least 1 minute, at least 2 minutes, at least 3 minutes, at least 4 minutes, or at least 5 minutes. In certain embodiments, fibers of the present disclosure are heat treated for a time of up to 15 minutes, up to 12 minutes, or up to 10 minutes. Typically, the fibers are treated after formation by heating them at 125-130° C. for 5-10 minutes. Such post-fiber formation heat treatment hastens surface migration of the fluorochemical urethane additive.

In certain embodiments, fine fibers of the present disclosure demonstrate at least 20%, or at least 30%, or at least 40%, or at least 50%, fine fiber layer efficiency retained per the Hot Water Soak Test in the Examples Section.

In certain embodiments, at the same generally low fiber coverage provided on a substrate (e.g., up to 5 minutes of a typical electrospinning process), the fine fibers that include a fluorochemical urethane additive demonstrate improved levels of fine fiber layer efficiency retained compared to the same fine fibers but without a fluorochemical urethane additive. See, e.g., FIG. 2.

In certain embodiments, at the same generally high fiber coverage provided on a substrate (e.g., at least 5 minutes of a typical electrospinning process), the fine fibers that include a fluorochemical urethane additive demonstrate improved water drop penetration resistance compared to the same fine fibers but without a fluorochemical urethane additive. Furthermore, at the same fluorochemical urethane additive concentration, the fine fibers demonstrate improved water drop penetration resistance with increasing fiber coverage provided on a substrate (e.g., during a typical electrospinning process). See, e.g., FIG. 3.

Filter Media and Filter Elements

Fine fibers of the present disclosure can be formed into a filter structure such as filter media. In such a structure, the fine fiber materials of the disclosure are disposed on (typically, they are formed on and adhered to) a filter substrate (i.e., filtration substrate or simply substrate). Natural fiber and synthetic fiber substrates can be used as the filter substrate. Examples include spunbonded or melt-blown supports or fabrics. The substrate may include wovens or nonwovens. Plastic screen-like materials both extruded and hole punched, are other examples of filter substrates, as are ultra-filtration (UF) and micro-filtration (MF) membranes of organic polymers.

The substrate may include synthetic fibers, cellulosic fibers, glass fibers, or combinations thereof. Examples of synthetic nonwovens include polyester nonwovens, nylon nonwovens, polyolefin (e.g., polypropylene) nonwovens, or blended nonwovens thereof. Sheet-like substrates (e.g., cellulosic and/or synthetic nonwoven webs) are the typical form of the filter substrates. The shape and structure of the filter material, however, is typically selected by the design engineer and depends on the particular filtration application.

A filter media construction according to the present disclosure can include a layer of permeable coarse fibrous material (i.e., media or substrate) having a first surface. A first layer of fine fiber media is preferably disposed on the first surface of the layer of permeable coarse fibrous media.

Preferably, the layer of permeable coarse fibrous material includes fibers having an average diameter of at least 5 microns, and more preferably at least 12 microns, and even more preferably at least 14 microns. Preferably, the coarse fibers have an average diameter of no greater than 50 microns.

Also, preferably, the permeable coarse fibrous material comprises a media having a basis weight of no greater than 260 grams/meter$^2$ (g/m$^2$), and more preferably no greater than 150 g/m$^2$. Preferably, the permeable coarse fibrous material comprises a media having a basis weight of at least 0.5 g/m$^2$, and more preferably at least 8 g/m$^2$. Preferably, the first layer of permeable coarse fibrous media is at least 0.0005 inch (12 microns) thick, and more preferably at least 0.001 inch (25.4 microns) thick. Preferably, the first layer of permeable coarse fibrous media is no greater than 0.030 inch (0.76 mm) thick. Typically, and preferably, the first layer of permeable coarse fibrous media is 0.001 inch to 0.030 inch (25-800 microns) thick. Preferably, the first layer of permeable coarse fibrous media has a Frazier permeability (differential pressure set at 0.5 inch of water) of at least 2 meters/minute (m/min). Preferably, the first layer of permeable coarse fibrous media has a Frazier permeability (differential pressure set at 0.5 inch (12.7 mm) of water) of no greater than 900 meters/minute (m/min).

In preferred arrangements, the first layer of permeable coarse fibrous material comprises a material which, if evaluated separately from a remainder of the construction by the Frazier permeability test, would exhibit a permeability of at least 1 m/min, and preferably at least 2 m/min. In preferred arrangements, the first layer of permeable coarse fibrous material comprises a material which, if evaluated separately from a remainder of the construction by the Frazier permeability test, would exhibit a permeability of no greater than 900 m/min, and typically and preferably 2-900 m/min. Herein, when reference is made to efficiency or LEFS efficiency (Low Efficiency Flat Sheet), unless otherwise specified, reference is meant to efficiency when measured according to ASTM-1215-89, with 0.78 micron (µm) monodisperse polystyrene spherical particles, at 20 fpm (feet per minute, 6.1 m/min) as described herein.

In certain embodiments, the filtration substrate has oleophobic properties before application of the fine fiber. For example, the filtration substrate may be inherently oleophobic (i.e., made of oleophobic fibers) and/or treated to become oleophobic using, for example, an oleophobic treatment compound. In general, oleophobic materials are fluorochemicals such as fluoropolymers with a high density of terminal $CF_3$ pendent groups exposed at the surface. In certain embodiments, filtration substrates, or oleophobic treatment compounds (e.g., fluorochemical treatment compounds) applied as surface coatings to filtration substrates, may be made from perfluoropolymers such as perfluoroacrylates, perfluorourethanes, perfluoroepoxies, perfluorosilicones, perfluoroalkanes, perfluorodioxolanes, or copolymers of these materials.

While a filtration substrate made from an inherently oleophobic material could be used, typically a fluorochemical treatment compound is coated on a conventional filtration substrate to make it oleophobic. The coating material could be, for example, an oleophobic polymer or another polymer that could be made oleophobic through a multiple step process. Typically, a fluorochemical treatment compound, dissolved or suspended in a liquid carrier (e.g., an organic solvent or water), is applied to a conventional filtration substrate by dipping or spraying.

Exemplary fluoropolymers include perfluoroacrylates dissolved in a solvent, such as those available under the trade names FLUOROPEL Series from Cytonix (Beltsville, Md.), SRA 450 or SRA451 from 3M Company (St. Paul, Minn.), ADVAPEL 806 from Advanced Polymer Incorporated (Carlstadt, N.J.); perfluorodioxolanes dissolved in a solvent, such as those available under the trade name TEFLON AF from Chemours (Wilmington, Del.); perfluoroacrylate emulsions suspended in water, such as those available under the trade names UNIDYNE from Daikin (Orangeburg, N.Y.), CAPSTONE from Chemours (Wilmington, Del.), PHOBOL from Huntsman (The Woodlands, Tex.), or ADVAPEL 734 from Advanced Polymer Incorporated (Carlstadt, N.J.); and perfluorourethanes suspended in water, such as that available under the trade name SRC220 from 3M Company (St.

Paul, Minn.). A filtration substrate could also be made oleophobic by applying a coating of a fluoropolymer through a plasma polymerization process, such as perfluoroacrylate coatings from P2i (Savannah, Ga.).

In certain embodiments, a non-oleophobic coating could also be applied to a conventional filtration substrate, and then modified to be oleophobic. For example, a polyalcohol polymer could be applied to a conventional filtration substrate and a perfluorosilane or a perfluoroacyl chloride grafted to this polymer. Alternatively, a polyamine could be applied to a conventional filtration substrate and a perfluoroacrylate grafted to this polymer.

Whatever method is used to make a filtration substrate oleophobic, preferably such oleophobic filtration substrate demonstrates an oleophobic level of at least 3, at least 4, at least 5, or at least 6, according to the Oil Repellency Test in the Examples Section.

In these embodiments, a layer of fine fiber can be manufactured by forming a plurality of fine fibers on a filtration substrate, thereby forming a filter media. The filter media (i.e., fine fiber layer plus filtration substrate) can then be manufactured into filter elements (i.e., filtration elements), including, e.g., flat-panel filters, cartridge filters, or other filtration components. Examples of such filter elements are described in U.S. Pat. No. 6,746,517 (Benson et al.); U.S. Pat. No. 6,673,136 (Gillingham et al.); U.S. Pat. No. 6,800,117 (Barris et al.); U.S. Pat. No. 6,875,256 (Gillingham et al.); U.S. Pat. No. 6,716,274 (Gogins et al.); and U.S. Pat. No. 7,316,723 (Chung et al.). The shape and structure of the filter material, however, is typically selected by the design engineer and depends on the particular filtration application.

During use, dust typically gets loaded up as a cake on the surface of filter media due to the presence of the fine fiber (surface filtration). Consequently, over time the pressure drop of the filter media increases, thereby dramatically increasing energy consumption resulting in short filter life. One way to improve filter life is to clean the surface loaded (with a dust cake) media by pulsing air in the opposite direction of the filtered air stream as the pressure drop reaches a specific set point. The pulsed air deforms the filter media and dislodges the dust cake resulting in a "cleaner media" with lower pressure drop, thereby prolonging filter life.

Unfortunately, in environments polluted with urban aerosols, oily or oil mist-based soot, the dust absorbs the oils and sticks to the fine fiber. In these cases, pulsed air may be unable to dislodge the dust cake. Increasing the pulsing amplitude (or pressure) can result in damage to the fine fiber and short filter life. The fine fibers described herein possess oleophobic surface properties that also result in suitable release properties. This surface chemistry will reduce oily or sooty dust from sticking to the fine fiber and thereby make it easier to dislodge during the pulsing process. This should result in a longer filter life.

Exemplary Fiber Embodiments

1. A fine fiber comprising (or consisting essentially of, or consisting of):
   a fiber-forming polyamide; and
   a fluorochemical urethane additive incorporated within the fine fiber;
   wherein the fluorochemical urethane additive includes one or more perfluorinated alkyl groups and/or perfluorinated heteroalkyl groups, and each alkyl or heteroalkyl group is bonded to a sulfonamido ($—SO_2NR^2—$) group, a carboxamido ($—C(O)NR^3—$) group, a carboxyl group ($—C(O)O—$), or a sulfonyl group ($—SO_2—$), wherein $R^2$ and $R^3$ are independently a hydrogen or an alkyl (in certain embodiments, each alkyl or heteroalkyl group is bonded to a sulfonamido ($—SO_2NR^2—$) group or a carboxamido ($—C(O)NR^3—$) group, wherein $R^2$ and $R^3$ are independently a hydrogen or an alkyl; in certain embodiments, the alkyl and heteroalkyl groups include 2-12 carbon atoms, and in certain embodiments 2-6 carbon atoms).

2. The fine fiber of embodiment 1 wherein the fluorochemical urethane additive is present in an amount effective to enhance the oleophobicity and hydrophobicity of the fine fiber compared to the same fine fiber without such additive.

3. The fine fiber of embodiment 1 or 2 wherein the fluorochemical urethane additive is the only additive present.

4. The fine fiber of any one of embodiments 1 through 3 wherein the fluorochemical urethane additive is a surface-migrating agent.

5. The fine fiber of any of embodiments 1 through 4 wherein the fluorochemical urethane additive is not chemically bonded to the fiber-forming polyamide.

6. The fine fiber of any of embodiments 1 through 5 comprising a core phase and a coating phase, wherein the core phase comprises the fiber-forming polyamide and the coating phase comprises the fluorochemical urethane additive.

7. The fine fiber of any of embodiments 1 through 6 wherein the fiber-forming polyamide comprises a nylon.

8. The fine fiber of embodiment 7 wherein the nylon comprises nylon-6, nylon-6,6, nylon-6,10, mixtures or copolymers thereof.

9. The fine fiber of embodiment 8 wherein the nylon comprises nylon-6-6,6-6,10.

10. The fine fiber of any of embodiments 1 through 9 wherein the fluorochemical urethane additive has a weight average molecular weight of less than 3000 Daltons.

11. The fine fiber of any of embodiments 1 through 10 comprising a core phase, a coating phase, and a transition phase.

12. The fine fiber of embodiment 11 wherein the core phase predominantly comprises the fiber-forming polyamide, the coating phase comprises the fluorochemical urethane additive, and the transition phase comprises the fiber-forming polyamide and the fluorochemical urethane additive.

13. The fine fiber of any of embodiments 1 through 12 wherein the fluorochemical urethane additive is selected and included in an amount effective to provide a fine fiber that demonstrates an oleophobic level of at least 3 (or at least 4, or at least 5, or at least 6), according to the Oil Repellency Test.

14. The fine fiber of any of embodiments 1 through 13 wherein the fluorochemical urethane additive is selected and included in an amount effective to provide a fine fiber hydrophobic, according to the Water Drop Test Method.

15. The fine fiber of any of embodiments 1 through 13 wherein the fluorochemical urethane additive and fiber-forming polyamide are present in a weight ratio of at least 2:100 (or at least 5:100, or at least 10:100, or at least 20:100).

16. The fine fiber of any of embodiments 1 through 15 wherein the fluorochemical urethane additive and fiber-forming polyamide are present in a weight ratio of up to 100:100 (or up to 50:100).
17. The fine fiber of any of embodiments 1 through 16 which has an average fiber diameter of no greater than 10 microns (or up to 5 microns, up to 4 microns, up to 3 microns, up to 2 microns, up to 1 micron, up to 0.8 micron, or up to 0.5 micron).
18. The fine fiber of any of embodiments 1 through 17 which has an average diameter of at least 0.05 micron (or at least 0.1 micron).
19. The fine fiber of any of embodiments 1 through 18 wherein the fluorochemical urethane additive is a film-forming polymer.
20. The fine fiber of any of embodiments 1 through 19 wherein the fluorochemical urethane additive is at least partially compatible with the fiber-forming polyamide.
21. The fine fiber of any of embodiments 1 through 20 wherein the fluorochemical urethane additive does not include acrylate or methacrylate functional groups.
22. The fine fiber of any one of the previous embodiments, wherein the fluorochemical urethane additive is selected and included in an amount effective to provide a fine fiber that demonstrates an improved level of fine fiber layer efficiency retained compared to a fine fiber without the fluorochemical urethane additive, when such fine fibers are deposited at the same generally low fiber coverage on the same substrate.
23. The fine fiber of any one of the previous embodiments, wherein the fluorochemical urethane additive is selected and included in an amount effective to provide a fine fiber that demonstrates an improved level of water drop penetration resistance compared to a fine fiber without the fluorochemical urethane additive at the same amount of fiber coverage on a substrate.

Exemplary Method Embodiments

1. A method of making a plurality of fine fibers, the method comprising:
   providing a fiber-forming polyamide;
   providing a fluorochemical urethane additive; and
   combining the fiber-forming polyamide and the fluorochemical urethane additive under conditions effective to form a plurality of fine fibers, wherein the fluorochemical urethane additive is incorporated within the fine fibers;
   wherein the fluorochemical urethane additive includes one or more perfluorinated alkyl groups and/or perfluorinated heteroalkyl groups, and each alkyl or heteroalkyl group is bonded to a sulfonamido ($-SO_2NR^2-$) group, a carboxamido ($-C(O)NR^3-$) group, a carboxyl group ($-C(O)O-$), or a sulfonyl group ($-SO_2-$), wherein $R^2$ and $R^3$ are independently a hydrogen or an alkyl (in certain embodiments, each alkyl or heteroalkyl group is bonded to a sulfonamido ($-SO_2NR^2-$) group or a carboxamido ($-C(O)NR^3-$) group, wherein $R^2$ and $R^3$ are independently a hydrogen or an alkyl; in certain embodiments, the alkyl and heteroalkyl groups include 2-12 carbon atoms, and in certain embodiments 2-6 carbon atoms).
2. The method of embodiment 1 wherein the fluorochemical urethane additive is the only additive present.
3. The method of embodiment 1 or 2 wherein the fluorochemical urethane additive is a surface-migrating agent.
4. The method of any of embodiments 1 through 3 wherein the fluorochemical urethane additive is not chemically bonded to the fiber-forming polyamide in the fine fibers.
5. The method of any of embodiments 1 through 4 wherein each fiber comprises a core phase and a coating phase, wherein the core phase comprises the fiber-forming polyamide and the coating phase comprises the fluorochemical urethane additive.
6. The method of any of embodiments 1 through 5 wherein the fiber-forming polyamide comprises a nylon.
7. The method of embodiment 6 wherein the nylon comprises nylon-6, nylon-6,6, nylon-6,10, mixtures or copolymers thereof.
8. The method of embodiment 7 wherein the nylon comprises nylon-6-6,6-6,10.
9. The method of any of embodiments 1 through 8 wherein the fluorochemical urethane additive has a weight average molecular weight of less than 3000 Daltons.
10. The method of any of embodiments 1 through 9 wherein each fiber comprises a core phase, a coating phase, and a transition phase.
11. The method of embodiment 10 wherein the core phase predominantly comprises the fiber-forming polyamide, the coating phase comprises the fluorochemical urethane additive, and the transition phase comprises the fiber-forming polyamide and the fluorochemical urethane additive.
12. The method of any of embodiments 1 through 11 wherein the fluorochemical urethane additive is selected and included in an amount effective to provide a fine fiber that demonstrates an oleophobic level of at least 3 (or at least 4, or at least 5, or at least 6) according to the Oil Repellency Test.
13. The method of any of embodiments 1 through 12 wherein the fluorochemical urethane additive is selected and included in an amount effective to provide a fine fiber hydrophobic, according to the Water Drop Test Method.
14. The method of any of embodiments 1 through 13 wherein the fluorochemical urethane additive and fiber-forming polyamide are present in a weight ratio of at least 2:100 (or at least 5:100, or at least 10:100, or at least 20:100).
15. The method of any of embodiments 1 through 14 wherein the fluorochemical urethane additive and fiber-forming polyamide are present in a weight ratio of up to 100:100 (or up to 50:100).
16. The method of any of embodiments 1 through 15 wherein the fine fibers have an average fiber diameter of no greater than 10 microns (or up to 5 microns, up to 4 microns, up to 3 microns, up to 2 microns, up to 1 micron, up to 0.8 micron, or up to 0.5 micron).
17. The method of any of embodiments 1 through 16 wherein the fine fibers have an average diameter of at least 0.05 micron (or at least 0.1 micron).
18. The method of any of embodiments 1 through 17 wherein the fluorochemical urethane additive is a film-forming polymer.
19. The method of any of embodiments 1 through 18 wherein the fluorochemical urethane additive is at least partially compatible with the fiber-forming polyamide.

20. The method of any of embodiments 1 through 19 wherein the fluorochemical urethane additive does not include acrylate or methacrylate functional groups.
21. The method of any of embodiments 1 through 20 wherein the fine fibers are heat treated after formation.
22. The method of embodiment 21 wherein the fine fibers are heat treated after formation by heating them at 100-135° C. for 0.5-15 minutes.
23. The method of embodiment 22 wherein the fine fibers are heat treated after formation by heating them at 125-130° C. for 5-10 minutes.

Exemplary Filter Media and Filter Element Embodiments

1. A filter media comprising a filtration substrate and a layer comprising a plurality of fine fibers of any of the embodiments disclosed herein disposed on the substrate.
2. The filter media of embodiment 1 wherein the fine fiber layer has a thickness of 0.05 μm to 30 μm.
3. The filter media of embodiment 1 or 2 wherein the filtration substrate is a nonwoven substrate.
4. The filter media of any of embodiments 1 through 3 wherein the filtration substrate comprises synthetic fibers, cellulosic fibers, glass fibers, or combinations thereof.
5. The filter media of any or embodiments 1 through 4 wherein the filtration substrate comprises a polyester nonwoven, a nylon nonwoven, a polyolefin nonwoven, or a blended nonwoven thereof.
6. The filter media of embodiment 5 wherein the filtration substrate comprises polypropylene nonwoven.
7. The filter media of any of embodiments 1 through 6 wherein the filtration substrate comprises a spunbonded or melt-blown support.
8. The filter media of any of embodiments 1 through 7 wherein the fine fiber layer is an electrospun layer.
9. The filter media of any of embodiments 1 through 8 wherein the filtration substrate is oleophobic.
10. The filter media of embodiment 9 wherein the oleophobic filtration substrate comprises oleophobic fibers.
11. The filter media of embodiment 9 or 10 wherein the oleophobic filtration substrate comprises a fluorochemical treatment compound.
12. The filter media of embodiment 11 wherein the fluorochemical treatment compound is selected from perfluoroacrylates, perfluorourethanes, perfluoroepoxies, perfluorosilicones, perfluoroalkanes, perfluorodioxolanes, and copolymers thereof.
13. A filter element comprising a filter media of any one of embodiments 1 through 12.

EXAMPLES

Objects and advantages of this disclosure are further illustrated by the following examples, but the particular materials and amounts thereof recited in these examples, as well as other conditions and details, should not be construed to unduly limit this disclosure. Unless otherwise noted, all parts, percentages, ratios, etc. in the examples and the rest of the specification are by weight, and all reagents used in the examples were obtained, or are available, from general chemical suppliers such as, for example, Sigma-Aldrich, Saint Louis, Mo., or may be synthesized by conventional methods.

| Tradename | Name Used in Examples | Description | Source |
|---|---|---|---|
| Isocor SVP 651 | 651 | polyamide (terpolymer) | Shakespeare/ Jarden Applied Materials |
| SRC-220 | SRC 220 | fluorinated urethane | 3M Company |
| SRA-250 | SRA 250 | fluorochemical acrylate | 3M Company |
| SRA-270 | SRA 270 | fluorinated acrylate modified urethane | 3M Company |
| AsahiGuard-E060 | AG-E060 | fluoropolymer | AGC Chemicals |
| AsahiGuard-E800D | AG-E800D | fluoropolymer emulsion | AGC Chemicals |
| AsahiGuard-E550D | AG-E550D | perfluoroalkyl methacrylate copolymer | AGC Chemicals |
| AsahiGuard-E090 | AG-E090 | fluoropolymer sodium salt | AGC Chemicals |
| AsahiGuard-E100 | AG-E100 | perfluoroalkyl methacrylate copolymer | AGC Chemicals |
| AsahiGuard-E082 | AG-E082 | perfluoro methacrylate copolymer | AGC Chemicals |
| KAYDOL | KAYDOL | heavy white mineral oil | Sonneborn Refined Products, Amsterdam, The Netherlands |

Test Procedures
Hot Water Soak Test

A sample of fine fibers in the form of a layer disposed on a substrate was submerged in water previously heated to a temperature of 140° F. After 5 minutes, the sample was removed, dried, and evaluated for the amount of fine fiber layer efficiency retained as determined according to the procedure described in U.S. Pat. No. 6,743,273 ("Fine fiber layer efficiency retained"). Low Efficiency Flat Sheet (LEFS) is utilized to calculate the amount of fine fiber layer retained by measuring the efficiency before and after hot water test. Herein, where reference is made to efficiency it was measured with 0.78 micron (μm) monodisperse polystyrene spherical particles, at 20 fpm (feet per minute, 6.1 m/min) as described in U.S. Pat. No. 6,743,273 (Chung et al.).

The amount of fine fiber retained is reported as a percentage of the initial amount of fine fibers and referred to as "fine fiber layer efficiency retained." This gives a good indication of whether the degree of crosslinking achieved was sufficient to protect the bulk material from attack/dissolution to hot water.

Oil Repellency Test (AATCC 118 Oil Repellency: Hydrocarbon Resistance Test)

A sample of uncorrugated cellulose media (cellulose substrate LEFS=19.5%) with fine fiber deposited on it (or an oleophobic-treated sample of uncorrugated cellulose media without fine fiber deposited on it for Example 28) was tested for oil repellency in the following manner: Drops of hydrocarbon fluid (decreasing surface tension) shown in the table below were placed on the fine fiber of the composite media and tested for wicking or wetting visually after 30 seconds (sec). If no wetting or obvious wicking was observed the next higher numbered liquid was placed adjacent to the previous drop. The test was discontinued when one of the liquids showed wetting or wicking for times of up to 30 sec. The oil rating as defined by the test is the number of the liquid with the lowest surface tension that does not wick through or wet the media after 30 sec. In essence, the higher the number (oil rating) the better the oil repellency to oils with lower surface tension.

In the figures shown, the drops placed on a filter media start with the "1" test liquid and go to the "9" test liquid (from left to right) until failure.

| Oil Repellency Grade Number | Composition | Surface Tension (25° C.) dynes/cm |
|---|---|---|
| 0 | None (fails KAYDOL) | — |
| 1 | KAYDOL | 31.5 |
| 2 | 65:35 KAYDOL:n-hexadecane by volume | — |
| 3 | n-hexadecane | 27.3 |
| 4 | n-tetradecane | 26.4 |
| 5 | n-dodecane | 24.7 |
| 6 | n-decane | 23.5 |
| 7 | n-octane | 21.4 |
| 8 | n-heptane | 19.8 |
| 9 | n-hexane | 18.4 |

Water Drop Test

A sample of uncorrugated cellulose media (cellulose substrate LEFS=19.5%) with fine fiber deposited on it was tested for water drop repellency. Similar to the methodology employed in the Oil Repellency Test, a drop of water was placed on the fine fiber of the composite media. In contrast to the Oil Repellency Test, media was tested visually for wetting or wicking by the water drop over a longer time period—immediately after placing the water drop, 5 minutes (min) after, and 15 min after—placing the water drop. Over longer periods of time, the water drop evaporated. A media is defined herein to be water repellent (i.e., hydrophobic) if there was no obvious signs of wetting or wicking over the 15-min time period.

Resistance to Water Penetration: Hydrostatic Head

A sample of uncorrugated cellulose media (cellulose substrate LEFS=19.5%) with fine fiber deposited on it was tested for water penetration repellency by measuring the hydrostatic head using the Hydrostatic Head Tester FX3000 from TexTest Instruments supplied by Advanced Testing Instruments. The pressure (in mbar) at which water droplets first penetrate through the media is referred to as the hydrostatic head and is a direct measurement of resistance to water droplet penetration.

Preparation Methods

Examples 1-7

Nylon copolymer resin (SVP 651 obtained from Shakespeare Co., Columbia, S.C., a terpolymer having a number average molecular weight of 21,500-24,800 comprising 45% nylon-6, 20% nylon-6,6 and 25% nylon-6,10) stock solution was prepared by dissolving the polymer in alcohol (ethanol, 190 proof) and heating to 60° C. to produce a 9% solids solution. In Example 1, no additives were added. This 651/ethanol solution served as a control. The solution was electrospun to form a layer of fine fiber on a filtration substrate using a flow rate of 0.12 milliliter per minute (mL/min) and a voltage of 34 kilovolts (kV). The fine fiber layer was collected on a substrate material (attached to a rotating drum). The composite media was then used for water and oil repellency of the fine fiber. Typically, an electrospun pendant drop system using a syringe and needle, and a spinning time of 10 minutes, is enough to completely cover and shield any effect of the substrate during the Water Drop Test and Oil Repellency Test. The substrate material was a wetlaid uncorrugated cellulose media from Hollingsworth and Vose (Grade FA 848).

For Examples 2-7, an oil repelling (i.e., oleophobic) fluorochemical urethane additive (available from 3M Company under the tradename SRC 220) was added to the cooled 651/ethanol solution. The additive was an aqueous dispersion of fluorochemical urethane with an additive solids content of approximately 15%. The amount of additive added was such that the amount of additive solids (that impart oil/water repellency) in the final polymer formulation used for making fibers ranged from SRC 220:651=1:100 to 50:100 (weight ratio) (Example 2, 3, 4, 5, 6, 7=SRC 220 (solids):651=1:100, 2:100, 5:100, 10:100, 20:100, and 50:100, respectively). The solution was agitated very gently and was then electrospun as described in Example 1. For Examples 2-7, however, a voltage of 46 kV was employed to form the fine fiber layer. As in Example 1, the fine fibers were disposed on the substrate by spinning for 10 minutes. In each of the Examples 1-7, half of the sheets were post treated (thermal treatment) at 125° C. for 10 minutes (herein referred to as Examples 1b-7b, respectively) and the other half of the same sheets were not subjected to any kind of post treatment (herein, referred to as Examples 1a-7a, respectively).

Examples 8-17

Example 8 was identical to Example 6b (SRC 220:651 weight ratio of 20:100, heat treated) except that the spinning time was restricted to 30 sec (instead of 10 min). Examples 9-12 were identical to Example 8 except that fibers were deposited for varying amounts of times—Examples 9, 10, 11, and 12=1, 2, 5, and 10 minutes, respectively. Example 13 was identical to Example 1b (no additive, heat treated) except that the spinning time was restricted to 30 sec (instead of 10 min). Examples 14-17 were identical to Example 13 (no additive, heat treated) except that fibers were deposited for varying amounts of times—Examples 14, 15, 16, and 17=1, 2, 5, and 10 minutes, respectively.

Examples 18-27

Example 18 was identical to Example 1b and Example 19 was identical to Example 6b. Examples 20-27 were identical to Example 19 except that different additives (described in Table 1) were utilized: Example 20=SRA 250; Example 21=SRA 270; Example 22=AG-E060; Example 23=AG-E800D; Example 24=AG-E090; Example 25=AG-E550D; Example 26=AG-E100; and Example 27=AG-E082.

Example 28

Example 28 was identical to Example 8 (SRC 220:651 weight ratio of 20:100, heat treated, 30 second spinning time) except that the cellulose media substrate (wetlaid uncorrugated cellulose media from Hollingsworth and Vose (Grade FA 848)) was treated to be oleophobic. Prior to application of the fine fiber, the uncorrugated cellulose media was treated by dip coating it in a fluoropolymer emulsion (10% solution of UNIDYNE TG5502 fluoropolymer (Daikin, Orangeburg, N.Y.) diluted in 2-propanol). The coated substrate was then dried in an oven at 80° C. for 10 minutes. After cooling to room temperature, the substrate without fine fibers disposed thereon demonstrated an oil repellency of 8 per the Oil Repellency Test. Also, the substrate with fine fibers disposed thereon demonstrated an oil repellency of 8 per the Oil Repellency Test.

Results
Bulk Properties of the Fine Fibers

The fine fiber samples produced in Examples 8-12 had an average fiber diameter of no greater than 10 microns. Typically, they possessed average fiber diameters ranging from 200 nm to 400 nm, as measured by Scanning Electron Microscopy (SEM). Certain of the samples were evaluated for fiber morphology and fine fiber water resistance using the Hot Water Soak Test. In addition, hydrostatic head measurements were performed on the samples to understand the effect of fine fiber coverage on the resistance to water drop penetration.

FIG. 1 compares the SEM images of the fibers obtained from Example 1b (SRC 220 (solids):651=0:100) and the fibers of Example 6b (SRC 220 (solids):651=20:100). Both fiber layers were formed on the same substrate material. Clearly, both fiber formation and the resulting fiber diameters are very similar, which indicates the absence of an adverse effect of the fluorochemical urethane additive on the 651 fiber formation.

Environmental Resistance

The presence of the oleophobic fluorochemical urethane additive results in fiber surface protection due to the migration of the oleophobic fluorochemical urethane additive to the surface. From an environmental-resistance perspective, the fine fiber water resistance was evaluated by performing the Hot Water Soak Test on uncorrugated flat sheet cellulose media of Example 1b (SRC 220 (solids):651=0:100) fiber versus the fine fibers of Examples 6b (SRC 220 (solids): 651=20:100).

FIG. 2 shows that at lower coverages (lower spinning times) following hot water soak, the fine fiber with the additive (Example 1b, squares) demonstrates improved levels of fine fiber layer efficiency retained in comparison to the control, i.e., no additive (Example 6b, triangles).

FIG. 3 demonstrates an improvement in the hydrostatic head (in millibar) (Examples 8-12 (squares)) or water drop penetration resistance with an increase in the amount of fine fibers (SRC 220 (solids):651=20:100) deposited on a substrate (as a result of increasing spinning times). FIG. 3 also demonstrates that, at the same generally high fiber coverage provided on a substrate (e.g., at least 5 minutes of a typical electrospinning process), the fine fibers that include a fluorochemical urethane additive (Examples 11 and 12 (squares at 5 and 10 minutes)) demonstrate improved water drop penetration resistance compared to the same fine fibers but without a fluorochemical urethane additive (Examples 16 and 17 (triangles at 5 and 10 minutes).

Effect of Additive Concentration on Water Drop and Oil Repellency

As discussed earlier in Example 1, a spinning time of 10 minutes was found to be enough to completely cover and shield any effect of the substrate during the Water Drop Test and Oil Repellency Test. Consequently, it is believed that the Water Drop and Oil Repellency Tests reflect the behavior solely of the fine fiber.

FIGS. 4 and 5 compare the effect of additive concentration and thermal treatment effects using the Water Drop Test. FIG. 4 demonstrates the minimum amount of additive (SRC 220:651 weight ratios) to obtain water repellency if not post-heat treated. FIG. 5 demonstrates the minimum amount of additive (SRC 220:651 weight ratios) to obtain water repellency if post-heat treated. For water repellency, the additive is required to be on the fine fiber surface. The repellency typically occurs due to the lower surface tension of the fluorinated groups. An identical effect could be achieved at lower additive concentrations by post-heat treating the samples, which hastens surface migration. FIG. 5 shows the same water resistance effect of FIG. 4 at a lower additive concentration (SRC 220 (solids):651=5:100 (Example 4b) versus 10:100 (Example 5a)) if the sample is post-heat treated.

FIG. 6 shows the effect of additive concentration on oil repellency using the Oil Repellency Test for post-treated samples (i.e., post-heat treated samples) (Examples 1b-7b). Similar to that observed for water drop repellency, sufficient additive concentration is necessary on the fiber surface to impart oil repellency characteristics. However, it appears that a lower additive concentration suffices (SRC 220 (solids):651=2:100 (Example 3b)) for oil repellency than for water repellency ((SRC 220 (solids):651=5:100 (Example 4b, FIG. 5)).

It is likely that post-fiber formation heat treatment improves surface migration of additives thereby promoting water and oil repellency.

Effect of Fiber Coverage on Composite Oil Rating

A spinning time of 10 minutes was found to be enough to completely cover and shield any effect of the substrate during the Water Drop Test and Oil Repellency Test. FIGS. 7 and 8 demonstrate the effect of fine fiber coverage on water and oil repellency (Examples 8-12, 17). More specifically, FIGS. 7 and 8 demonstrate the effect of the fine fiber layer on the composite (substrate+fine fiber) water drop repellency (using the Water Drop Test) and oil repellency rating (using the Oil Repellency Test). At higher coverage, the fine fiber completely covers the substrate. The oil rating in this case reflects fine fiber oil rating (as if the substrate plays no role or doesn't exist). At a lower fine fiber coverage the substrate contributes or even dominates. Previously, it was observed higher additive ratios for water drop repellency as opposed to oil repellency. In this case, water drop repellency seems to require a higher coverage (5 min) versus oil repellency (2 min). It is believed that this is due to the polyurethane backbone of the SRC 220 additive.

Effect of Different Additives

FIGS. 9 and 10 compare the effect of various additives on the fine fiber (very high fine fiber coverage on substrate; spinning time=10 min) water drop penetration and oil repellency or oil rating. Clearly, SRC 220 is the only exemplified additive that fulfills both the hydrophobicity and oleophobicity criteria. While fibers with additives AG-E800D and 550D each pass the hydrophobic test (i.e., the Water Drop Test), they fail the oleophobic test (i.s., the Oil Repellency Test). It is hypothesized that for an additive to be effective to make oleophobic fibers, the additive is at least partially compatible with the additive polymer (no gross phase separation). Secondly the additive should be fluorochemical urethane additives that contain perfluorinated alkyl group (e.g., —$(CF_2)_n CF_3$ wherein n=2-5) or perfluorinated heteroalkyl groups. The fluorochemical urethane additive meets this criterion. The fluorochemical urethane additive is partially or completely compatible with SVP 651 (note that both the polymer and the additive have amide groups which can result in hydrogen bonding interactions, which can lead to at least partial compatibility). Consequently, other additives tested (see Table 1) all failed.

Although it is not intended to be limiting, it is believed that fiber spinning is a fast process where the additives (typically polymers in this case) get frozen in the fiber-forming polymer matrix. Annealing (thermal treatment) can help the additive migration and completely organize on the fibers. Depending on the molecular weight of the additives, however, even if they do migrate to the surface there is tendency for domain formation (due to incompatibility)

thereby failing to provide water and oil repellency. In the case where the fluorochemical urethane additive improved the oil rating dramatically at least partial compatibility helps to prevent domain formation, and urethane, which has a relatively a low Tg, diffuses faster (even in the case of frozen-in chain segments) to migrate to the surface and organize appropriately.

Effect of Substrate Chemistry on Composite Oil Rating

The use of oleophobic filtration substrates to increase composite oil repellency is shown through comparison of Example 8 with Example 28. As demonstrated above, application of low coverages of fine fiber results in a composite oil rating like that of the underlying substrate. This was demonstrated through application of fine fiber at low coverages to standard cellulose (Example 8) and oleophobic-coated cellulose (Example 28). It can be seen in FIG. 11 that low surface coverage of oleophobic fine fiber only produced an oil repellency rating of 1 (Example 8). In contrast, application of the same amount of oleophobic fine fiber to an oleophobic cellulose substrate produced an oil repellency rating of 8 (Example 28).

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

The invention claimed is:

1. A fine fiber comprising:
a fiber-forming polyamide; and
a fluorochemical urethane additive incorporated within the fine fiber;
wherein the fluorochemical urethane additive includes one or more perfluorinated alkyl groups and/or perfluorinated heteroalkyl groups, and each alkyl or heteroalkyl group is bonded to a sulfonamido ($-SO_2NR^2-$) group, a carboxamido ($-C(O)NR^3-$) group, a carboxyl group ($-C(O)O-$), or a sulfonyl group ($-SO_2-$), wherein $R^2$ and $R^3$ are independently a hydrogen or an alkyl, and
wherein the fine fiber is an electrospun fiber having an average diameter less than 10 μm and comprises a core phase and a coating phase, wherein the fiber-forming polyamide is present in the core phase at a concentration of 50% by weight or more and the fluorochemical urethane additive is present in the coating phase at a concentration of 50% by weight or more.

2. The fine fiber of claim 1 wherein the fluorochemical urethane additive is present in an amount effective to enhance the oleophobicity and hydrophobicity of the fine fiber compared to the same fine fiber without such additive.

3. The fine fiber of claim 1 wherein the fluorochemical urethane additive is the only additive present.

4. The fine fiber of claim 1 comprising a core phase and a coating phase, wherein the core phase comprises the fiber-forming polyamide and the coating phase comprises the fluorochemical urethane additive.

5. The fine fiber of claim 1 wherein the fiber-forming polyamide comprises a nylon.

6. The fine fiber of claim 5 wherein the nylon comprises nylon-6, nylon-6,6, or nylon-6,10, or mixtures or copolymers thereof.

7. The fine fiber of claim 1 wherein the fluorochemical urethane additive has a weight average molecular weight of less than 3000 Daltons.

8. The fine fiber of claim 1 comprising a core phase, a coating phase, and a transition phase.

9. The fine fiber of claim 1 wherein the fluorochemical urethane additive is selected and included in an amount effective to provide a fine fiber that demonstrates an oleophobic level of at least 3, according to the Oil Repellency Test.

10. The fine fiber of claim 1 wherein the fluorochemical urethane additive is selected and included in an amount effective to provide a fine fiber hydrophobic, according to the Water Drop Test.

11. The fine fiber of claim 1 wherein the fluorochemical urethane additive and fiber-forming polyamide are present in a weight ratio of at least 10:100 and up to 100:100.

12. The fine fiber of claim 1 which has an average fiber diameter of up to 1 μm.

13. The fine fiber of claim 1 wherein the fluorochemical urethane additive is at least partially compatible with the fiber-forming polyamide.

\* \* \* \* \*